No. 877,105. PATENTED JAN. 21, 1908.
D. McF. MOORE.
GLASS BLOWER'S CLAMP.
APPLICATION FILED FEB. 26, 1903.
3 SHEETS—SHEET 1.
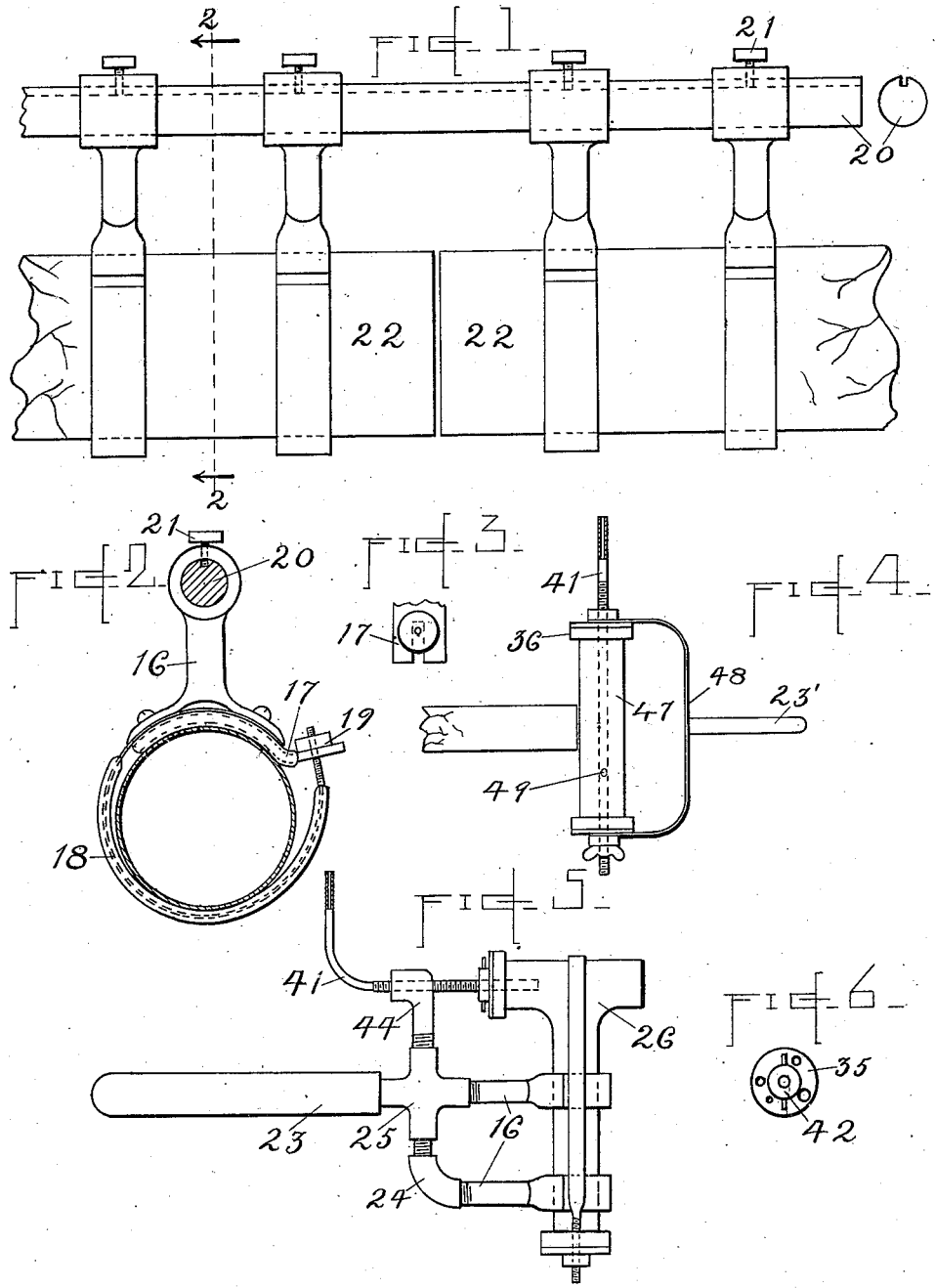

No. 877,105. PATENTED JAN. 21, 1908.
D. McF. MOORE.
GLASS BLOWER'S CLAMP.
APPLICATION FILED FEB. 26, 1903.
3 SHEETS—SHEET 2.
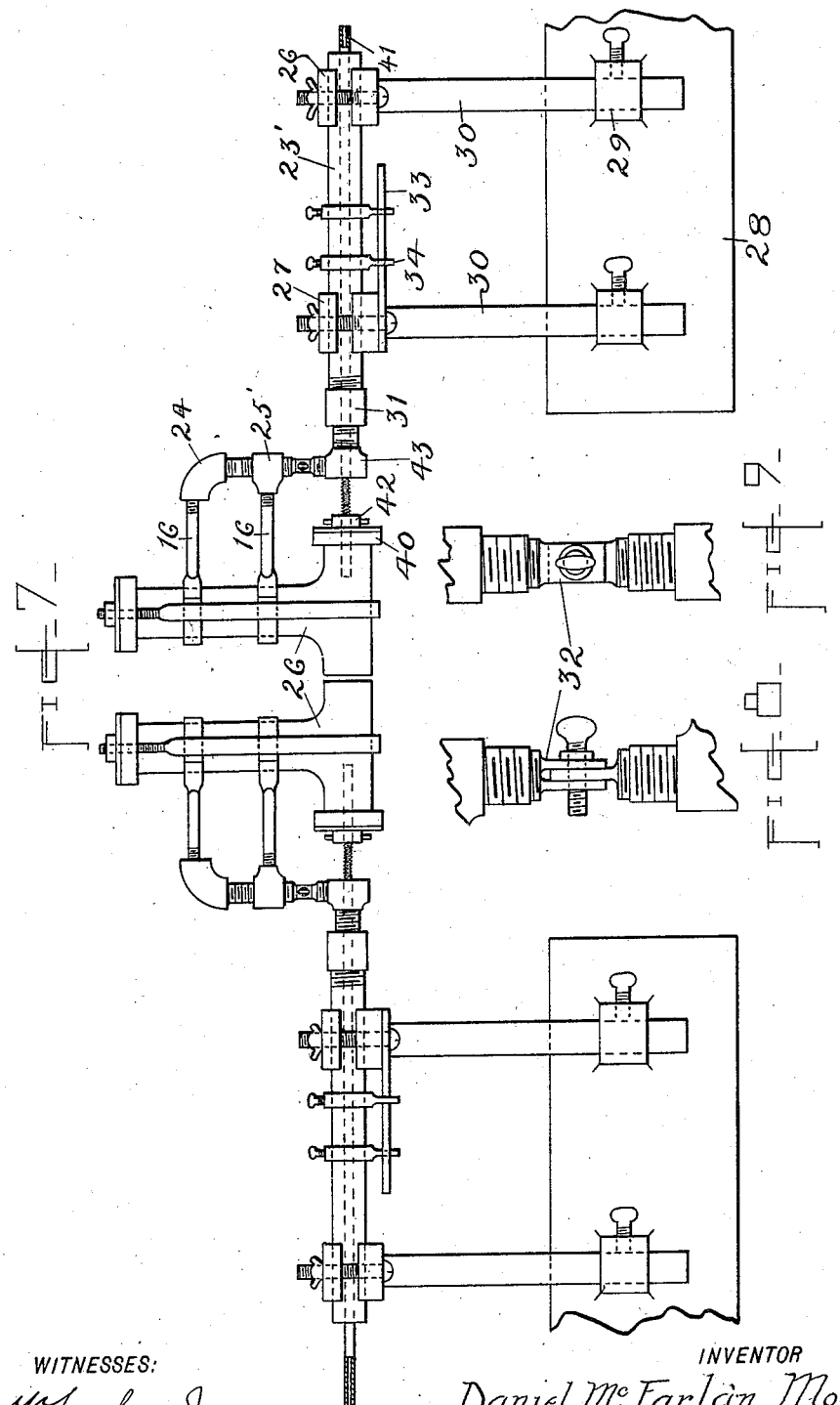
WITNESSES:
INVENTOR
Daniel McFarlan Moore
BY
Townsend + Decker
ATTORNEYS

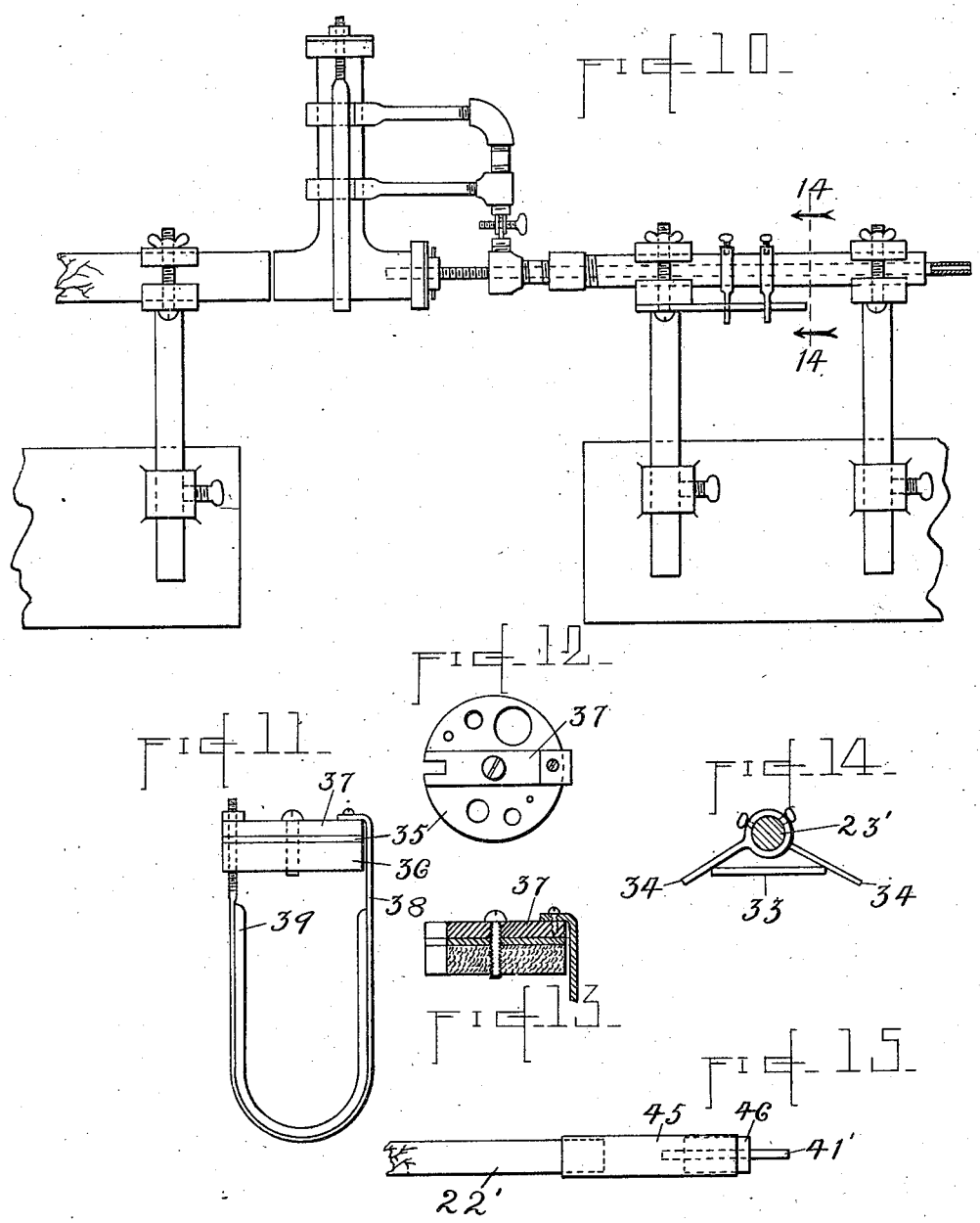

UNITED STATES PATENT OFFICE.

DANIEL McFARLAN MOORE, OF NEWARK, NEW JERSEY, ASSIGNOR TO MOORE ELECTRICAL CO., OF NEW YORK, N. Y., A CORPORATION OF NEW YORK.

GLASS-BLOWER'S CLAMP.

No. 877,105.  Specification of Letters Patent.  Patented Jan. 21, 1908.

Application filed February 26, 1903. Serial No. 145,183.

*To all whom it may concern:*

Be it known that I, DANIEL McFARLAN MOORE, a citizen of the United States, and a resident of Newark, in the county of Essex and State of New Jersey, have invented certain new and useful Improvements in Glass-Blowers' Clamps, of which the following is a specification.

My invention relates to apparatus for use by glass blowers in uniting or welding together glass tubes and especially to improved means for clamping or holding glass tubes or tubular structures of glass in the desired positions while fusing them together. The invention also relates to certain adjuncts of the clamps whereby air pressure may be readily applied to the interior of the tubular structures when desired.

The invention therefore consists in the construction and combination of parts for the purposes and to the end above outlined and in the manner substantially as hereinafter fully set forth and claimed.

In the accompanying drawings which form a part of this specification, Figure 1, represents in side elevation a series of clamps supporting two tubes to be welded together Fig. 1ª represents an end view the clamp supporting rod shown in Fig. 1; Fig. 2 is a vertical transverse section of the apparatus seen in Fig. 1, taken in the plane indicated by line 2—2; Fig. 3 is a detail in plan of a portion of the clamp shown in Fig. 2; Fig. 4 illustrates my improved mode of forming a T from two glass tubes; Fig. 5 illustrates a modification in the apparatus for holding a tubular structure, in the present instance, a glass T preparatory to welding said T to a glass tube or other tubular structure of glass; Fig. 6 is an elevation of a portion of the apparatus seen in Fig. 5; Fig. 7 illustrates my invention as applied to the formation of a union between two tubular T's of glass; Figs. 8 and 9 represent on an enlarged scale, a front and side view respectively of a clamp or union used in the apparatus seen in Figs. 7 and 10; Fig. 10 represents a portion of the apparatus seen in Fig. 7, as used in welding a tubular T to a straight tube; Fig. 11 illustrates in elevation a stopper used in closing one end of the tubular T, during welding; Fig. 12 shows a plan of said stopper; Fig. 13 shows a vertical section through the stopper; Fig. 14 represents a vertical sectional view of a portion of the apparatus seen in Fig. 10, said section being taken in the plane indicated by the line 14—14; Fig. 15 illustrates a modified form of stopper for use in welding glass tubes.

In welding together tubular structures of glass, it is essential that the edges to be welded shall exactly meet one another in order to produce a satisfactory union. It is also essential that some means be provided whereby the glass at the joint may be prevented from moving towards the center of the tube. These objections are overcome in my invention through the agency of suitable clamps and supporting devices therefor and suitable stoppers and air-distributers as shown in the accompanying drawings and hereinafter specified.

For the support of tubes to be welded, and particularly tubes of considerable size, I have designed a clamp such as illustrated in detail in Figs. 1 and 2. This clamp consists of a shank 16 to which one jaw of the clamp as 17 is attached, the outer end of which is bifurcated as seen in Fig. 3. The coöperating jaw 18 of said clamp is also attached to said shank and consists of a flexible band terminated by a screw-threaded portion adapted to enter the bifurcation in the jaw 17 and to be held in place therein by means of a nut 19. The jaws 17 and 18 of said clamp are preferably covered with some noncombustible yielding substance or material, such for instance, as asbestos, such coating being represented in Fig. 2. Where two straight tubes are to be welded together, each may be supported by a series of the clamps just described and said clamps mounted upon a rod or bar as indicated at 20. This rod or bar is preferably provided with a groove longitudinally thereof to receive a set-screw as 21 passing through an eye on the shank 16 of the clamp described, said clamps being strung upon the rod 20, as clearly seen in Fig. 1. The set-screws 21 prevent the clamps from axial movement about the rod 20, and at the same time provide for longitudinal adjustment upon said rod and for holding the clamps in place when satisfactorily adjusted. By this construction it will be seen that the tubes represented at 22 may be held in exact alinement and either one or both of them may be moved in the direction of their axes in the welding operation. If it is desired to move both of them, all the set-screws 21 will be loosened sufficiently to permit such movement; or, if it is desired to move but one of said tubes, the clamps supporting the same will be fixed in position by said set-screws, while the clamps supporting the other tube will be permitted free movement along the rod 20.

Obviously, the shank 16 may be terminated by other securing means than the eyes illustrated in Figs. 1 and 2, as for instance, by screw-threaded ends as seen in Figs. 5, 7 and 10, whereby they may be applied to screw-threaded sockets on any other suitable form or support which may take the place of the rod 20. This last mode of supporting the clamps is preferable in the manipulation of glass T's. In Fig. 5, the said clamps are shown as thus mounted in screw-threaded sockets carried by a suitable handle as 23, said sockets in the present instance being formed one in an elbow 24, and the other in a double metal T 25, both carried by said handle. The glass T supported by this clamp is represented at 26. This form of support may be held in the hand by the handle 23, or may be mounted in suitable clamps if desired, substantially as represented in Figs. 7 and 10. In Fig. 4 the support is shown held against the ends of section tube 47 by nuts on the screw-threaded tube 41. A handle as 23', or other suitable support may be attached to the tube 47 by means of a bail 48, through the ends of which the tube 41 passes. The air tube 41 may be closed at one end, and have a perforation within the tube 47 as at 49. A section of tube is shown presented to the middle of the tube 47 preparatory to making a T joint, in which case a suitable opening would, of course, be formed preparatory to the operation in the side of the tube 47.

In Fig. 7, my mode of supporting and manipulating two glass T's during the welding of the same is illustrated wherein the clamps already described are represented as mounted by their shanks 16 in substantially the manner shown in Fig. 5, and the handle for carrying the same, somewhat modified, is illustrated at 23' as supported in clamps 26, 27, attached to a bench or other suitable support, a portion of which is seen at 28, lugs or projections as 29 being formed upon said table for the reception of the standards 30, which bear the clamps 26 and 27 at their upper ends. The handles 23' are preferably tubular and are provided with nipples 31 into which, if desired, may be screwed other forms of clamp supports than those illustrated in Figs. 7 and 10. I prefer also to provide the clamp supports just referred to with an adjustable union represented at 32, said union being shown on an enlarged scale in Figs. 8 and 9. By means of this union the T's or other tubular structures may be given a final adjustment to bring the parts to be welded into proper alinement.

To provide for retaining the tubular structures in proper alinement during the welding or fusing of the same together, and while one or both of the supports therefor are left in a condition to be moved towards one another, I supply suitable guides. One form of guide for this purpose is illustrated in Figs. 7 and 10, and in Fig. 14. These guides consist of a plate or bar as 33 secured, for instance, to a clamp 27, and fingers as 34 secured to the rod 23', as by means of set-screws and engaging the lateral edges of the plate 33. It is evident that when the clamps 26 and 27 are loosened sufficiently to allow longitudinal movement of the rod 23' the fingers 34 by contact with the edges of the plate 33 will prevent any lateral displacement of the T 26 as it is advanced to the part to which it is to be welded.

For the purpose of preventing any sinking in of the tubular structures at the point of union while in a plastic condition during the welding operation, air-pressure is preferably employed. Such pressure may be supplied by various means. I have found the means about to be described very advantageous for this purpose. For example, in manipulating a tubular structure I close up by means of suitable stoppers all ends save those to be welded together.

In the welding of a tubular T, I use a stopper substantially such as represented in detail in Figs. 11, 12 and 13, and shown applied in Figs. 5, 7 and 10. This stopper consists of a metallic plate as 35, to which is secured a disk of flexible non-heat-conducting material, preferably asbestos, as seen at 36. If desired, a strengthening bar as 37 may be secured across the plate 35, and from this may extend a metallic strip as 38 by which the opposite side of the T may be encircled, the free end of said strip being screw-threaded and secured by a nut as shown in a suitable notch in the cross-bar 37 and said disks as indicated in Figs. 11–13. This strip 38, is preferably lined with a strip of asbestos or other similar material indicated at 39. The other free end of the tubular T may be closed by a stopper similarly constructed and held in place by any suitable device. Either of these stoppers may be perforated for the insertion of an air-tube, but in the structures illustrated the stopper 40 for the head of the T is the one preferably formed for the reception of the air-tube. In Figs. 7 and 10 the air-tube is illustrated at 41 and is preferably passed through a support 23' and the center of stopper 40. This tube is also preferably screw-threaded in the vicinity of the stopper and provided with a nut 42 by which said stopper may be tightened against the T. The screw-threaded portion of said rod 41 also passes through a screw-threaded aperture in the clamp support as at 43, whereby said tube is held against longitudinal displacement. A slight modification in the manner of supporting said tube 41 is seen in Fig. 5, wherein the air tube is supported on a portion 44 projecting from a clamp support. The plates 35 of the stoppers are preferably perforated, as seen in Figs. 6 and 12, for ventilating the asbestos washers attached thereto.

Not only may the tubes 41 be used for the admission of air for supporting the plastic walls of the tubes during the welding operation, but also for the admission of heated air to said tubes or tubular structures prior to and succeeding the welding operation, to insure against cracking of glass in raising the temperature thereof to the fusing point and in cooling it off after fusing.

Stoppers may be applied to tubular structures and particularly to tubes of smaller size in other ways than those just described, as for example, by means of a rubber tube supplied with a cork or other suitable stopper at one end and adapted to have its other end applied to the glass tube. Such structure is illustrated in Fig. 15, wherein 45 represents the rubber tube, 46 the stopper, and 41' the air-tube passing through said stopper, the glass tube being represented at 22'.

Other modifications of the form and construction of parts aside from those described may be made without departing from my invention.

What I claim as my invention is:

1. In an apparatus for joining tubes of glass, a tube supporting frame provided with a clamp, adapted to grasp one arm of a T and a stopper, also supported by said frame and adapted to close the opening in another arm of the T.

2. In an apparatus for joining tubes of glass to form T's or other similar shapes, a tube holding frame having a stopper for an arm of the T combined with an air supply tube running through said stopper and means for clamping said stopper tightly against the end of the tube.

3. In an apparatus adapted to use for joining tubes of glass to form T's or other similar shapes, a tube holding frame in combination with a tube stopper consisting of a plate of some heat nonconductor, and a plate of metal provided with perforations therein, a hollow tube running longitudinally through the tube and plates and a clamp on said hollow rod for tightening said plates against the end of the tube.

4. An apparatus adapted to hold glass T's or other similar shapes comprising clamps adapted to encircle one arm of the T, stoppers for closing the ends of said T, a blow-pipe passing through one of said stoppers and into said T, said blow pipe and clamps being held together by a common union and means for supporting said union.

5. An apparatus adapted to hold glass T's or other similar shapes comprising clamps adapted to encircle one arm of the T, said clamps being made up of a strip of flexible metal covered with some heat nonconductor and terminating in a tightening device whereby the strips are drawn tightly around the tube and threaded rods connecting the said clamps to a common union.

6. An apparatus adapted to hold glass T's or other similar shapes comprising clamps for holding the T, stoppers for closing the ends of said T, said stoppers being made up of some heat nonconductor such as asbestos, a disk of metal, and clamping devices adapted to hold said stopper in place.

7. An apparatus adapted to hold glass T's or other similar shapes comprising clamps to hold the T, stoppers for closing the ends of said T, a blow-pipe passing through one of said stoppers and into the T, said clamps and blow-pipe being combined with a hollow rod or pipe and a T or any other suitable coupling.

8. An apparatus adapted to hold glass T's or other similar shapes comprising clamps adapted to hold the T, stoppers for closing the ends of said T, a blow-pipe passing through one of said stoppers and into the T, said clamps and blow-pipe being combined with a hollow rod or pipe and a T or any other suitable coupling, said blow pipe passing longitudinally through and extending indefinitely beyond the said hollow rod or pipe.

9. An apparatus adapted to hold glass T's or other similar shapes comprising clamps adapted to hold the T, stoppers for closing the ends of said T, a blow-pipe passing through one of said stoppers and into the T, said clamps and blow-pipe being combined with a hollow rod or pipe and a T or other suitable coupling said hollow rod or pipe being held by clamps adapted to allow the said hollow rod to pass horizontally through them or to hold it securely in one position.

10. An apparatus adapted to hold glass T's or other similar shapes comprising clamps adapted to hold the T, stoppers for closing the ends of said T, a blow-pipe passing through one of said stoppers and into the T, said clamps and blow-pipe being combined with a hollow rod or pipe and a T or other suitable coupling, said hollow rod being supported by a framework adapted so that the above-described apparatus may move in a vertical plane or to be held rigidly by means of clamps or other suitable tightening devices.

11. An apparatus adapted to hold glass T's or other similar shapes comprising clamps adapted to hold the T, stoppers for closing the ends of said T, a blow-pipe passing through one of said stoppers and into the T, said clamps and blow-pipe being combined with a hollow rod or pipe and a T or other suitable coupling, said hollow rod or pipe being held by clamps adapted to allow the said hollow rod to pass horizontally through them or to hold it (the said hollow rod) securely in one position, and adjustable guides on said hollow rod whereby the above-described apparatus is always retained in a vertical position.

Signed at New York city in the county of New York and State of New York this 20th day of February, A. D. 1903.

DANIEL McFARLAN MOORE.

Witnesses:
J. GALLWITZ,
E. L. LAWLER.